(12) United States Patent
Lee

(10) Patent No.: US 7,974,293 B2
(45) Date of Patent: Jul. 5, 2011

(54) METHOD AND APPARATUS FOR TRANSCRYPTING OR TRANSCODING CONTENT FOR A TERMINAL WITHIN A VEHICLE

(75) Inventor: Sean S. Lee, Rockville, MD (US)

(73) Assignee: The DIRECTV Group, Inc., El Segundo, CA (US)

( * ) Notice: Subject to any disclaimer, the term of this patent is extended or adjusted under 35 U.S.C. 154(b) by 459 days.

(21) Appl. No.: 11/715,179

(22) Filed: Mar. 7, 2007

(65) Prior Publication Data

US 2008/0107133 A1    May 8, 2008

Related U.S. Application Data

(60) Provisional application No. 60/857,038, filed on Nov. 6, 2006.

(51) Int. Cl.
*H04J 3/00* (2006.01)
*G06F 21/00* (2006.01)
*G06F 15/16* (2006.01)
*H04N 7/20* (2006.01)
*H04N 7/173* (2011.01)

(52) U.S. Cl. ............... 370/395.52; 370/465; 705/51; 709/203; 709/217; 709/246; 725/64; 725/91

(58) Field of Classification Search ............ 370/395.52, 370/465; 705/51; 709/203, 217, 246; 725/64, 725/91
See application file for complete search history.

(56) References Cited

U.S. PATENT DOCUMENTS

| | | | |
|---|---|---|---|
| 5,583,561 A | 12/1996 | Baker et al. | |
| 5,760,819 A | 6/1998 | Sklar et al. | |
| 5,801,751 A | 9/1998 | Sklar et al. | |
| 5,956,716 A | 9/1999 | Kenner et al. | |
| 5,990,928 A | 11/1999 | Sklar et al. | |
| 6,201,797 B1 | 3/2001 | Leuca et al. | |
| 6,208,307 B1 | 3/2001 | Frisco et al. | |
| 6,421,733 B1 * | 7/2002 | Tso et al. | 709/246 |
| 6,529,706 B1 | 3/2003 | Mitchell | |
| 6,813,777 B1 * | 11/2004 | Weinberger et al. | 725/76 |
| 6,898,618 B1 * | 5/2005 | Slaughter et al. | 709/203 |
| 6,981,029 B1 * | 12/2005 | Menditto et al. | 709/217 |
| 7,249,106 B1 * | 7/2007 | Tanabe et al. | 705/57 |
| 7,454,485 B2 * | 11/2008 | Kukkal | 709/223 |
| 7,519,681 B2 * | 4/2009 | Edwards et al. | 709/217 |
| 7,600,262 B2 * | 10/2009 | Nomura | 726/27 |
| 7,716,708 B2 * | 5/2010 | Nishimura et al. | 725/97 |
| 7,756,880 B2 * | 7/2010 | Sighart et al. | 707/751 |
| 7,793,329 B2 * | 9/2010 | Joshi et al. | 725/120 |
| 2002/0065748 A1 * | 5/2002 | Taniguchi et al. | 705/27 |

(Continued)

OTHER PUBLICATIONS

Non-final Office Action dated Oct. 14, 2009 in U.S. Appl. No. 11/715,165, filed Mar. 7, 2007 by Sean S. Lee.

(Continued)

*Primary Examiner* — Alpus H Hsu

(57) ABSTRACT

A system 10 for distributing content includes a content provider 12 that provides content through various devices including a satellite 26 or a terrestrial-based system 38. The content provider 12 provides content to a content distribution system 70 within a vehicle 60. The method associated with the system includes generating a request for a list of content from a terminal, providing a list of content to a terminal, selecting a selection from the list of content, transcrypting or transcoding the content, streaming the content corresponding to the selection to the terminal and displaying the content on the terminal.

47 Claims, 12 Drawing Sheets

U.S. PATENT DOCUMENTS

| | | |
|---|---|---|
| 2002/0072332 A1 | 6/2002 | Chang et al. |
| 2003/0069990 A1 | 4/2003 | D'Annunzio et al. |
| 2003/0172186 A1* | 9/2003 | Dunn et al. .................. 709/246 |
| 2003/0208764 A1 | 11/2003 | Galipeau et al. |
| 2005/0047426 A1* | 3/2005 | Aaltonen et al. ............. 370/432 |
| 2006/0107295 A1 | 5/2006 | Margis et al. |
| 2006/0168323 A1* | 7/2006 | Kim et al. .................... 709/238 |
| 2006/0173594 A1 | 8/2006 | Kolletzki |
| 2007/0027814 A1* | 2/2007 | Tuoriniemi .................... 705/59 |
| 2007/0162947 A1* | 7/2007 | Bertin ........................... 725/134 |
| 2008/0147864 A1* | 6/2008 | Drogo De Iacovo et al. . 709/226 |
| 2008/0184300 A1 | 7/2008 | Macrae et al. |
| 2009/0228908 A1 | 9/2009 | Margis et al. |
| 2009/0265750 A1 | 10/2009 | Jones et al. |

OTHER PUBLICATIONS

Non-final Office action dated Jun. 8, 2010 in U.S. Appl. No. 11/715,165, filed Mar. 7, 2007 by Sean S. Lee.

Non-final Office action dated Nov. 23, 2010 in U.S. Appl. No. 11/715,165, filed Mar. 7, 2007 by Sean S. Lee.

* cited by examiner

METHOD AND APPARATUS FOR TRANSCRYPTING OR TRANSCODING CONTENT FOR A TERMINAL WITHIN A VEHICLE

CROSS-REFERENCE TO RELATED APPLICATIONS

This application claims the benefit of U.S. Provisional Application No. 60/857,038, filed on Nov. 6, 2006. The disclosure of the above application is incorporated herein by reference.

TECHNICAL FIELD

The present disclosure relates generally to a communication system for distributing content to multiple terminals and, more specifically, to providing transcrypted or transcoded content to multiple terminals within a vehicle.

BACKGROUND

The statements in this section merely provide background information related to the present disclosure and may not constitute prior art.

In this information age, content providers are increasingly investigating ways in which to provide more content to users. This may be performed by increasing access to users in places where content is not currently available.

Wireless communication systems have become commonplace for use in many types of communication services such as data transfer, voice communications, television services and other data transfer applications.

It is desirable to provide video content in various types of vehicles such as planes, trains, ships, and buses. Many systems have been proposed for providing content to various users within an airplane. Conveniently providing these services to users within a vehicle may make acceptance of these services more widely available.

Airplane content distribution systems exist in which each user may select from number of channels provided throughout the airplane. The system in a sense acts as a head end system. When tuning a channel, a program in progress may be viewed. That is, every user terminal tuned to the channel is viewing the identical portion of the program, show, or movie. In some cases the content may not be in a desirable format.

SUMMARY

The present disclosure provides a convenient method and apparatus for accessing content and distributing content within a vehicle. This may be done so each user has independent control of the content being viewed and the format such as encrypting and encoding is in the desired format.

In one aspect of the disclosure, a method of operating a system includes generating a request for a list of content from a terminal, providing a list of content to a terminal, selecting a selection from the list of content, transcrypting or transcoding the content, streaming the content corresponding to the selection to the terminal and displaying the content on the terminal.

In a further aspect of the disclosure, a content distribution system for storing content includes a storage device, a server in communication with the storage device communicating content using packetized transport protocol and a first terminal communicating with the server. The first terminal generating a request for a list of content, receiving the list of content from the server and selecting a selection from the list of content. The server or the terminal transcrypts or transcodes the content. The server streams the content corresponding to the selection to the terminal. The terminal the displays the content.

One advantage of the system is that independent control and communication between the central server and various terminals within the vehicle may be performed. Another advantage is that the terminal may be provided with content in a desired format. Also, when a portable device purchases selected content the desired format may be provided by transcrypting or transcoding at the terminal or server.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
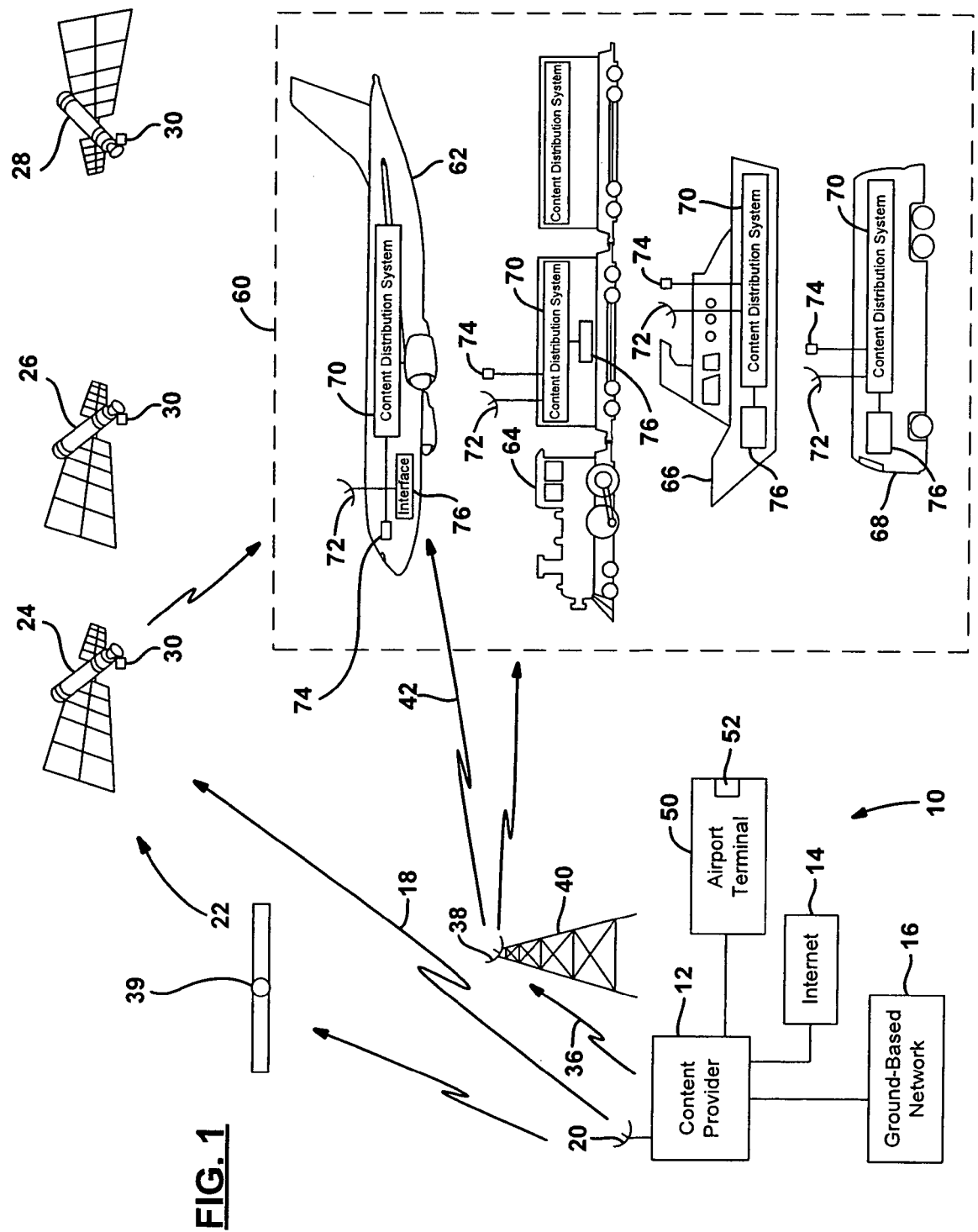
FIG. 1 is a system diagram of a communication system according to the present disclosure.

The following description is merely exemplary in nature and is not intended to limit the present disclosure, application, or uses. The following example is set forth with respect to a mobile system for multiple viewers. Although not limited thereto, the teaching of the disclosure may be implemented in various types of vehicles including airplanes, trains, ships, buses, and even smaller vehicles such as vans, SUVs, and recreational vehicles.

For purposes of clarity, the same reference numbers will be used in the drawings to identify similar elements. As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present disclosure.

Referring now to FIG. 1, a communication system 10 is illustrated. The communication system 10 may be a satellite television broadcast system. The communication system includes a content provider 12 that may, for example, be a head end or the like. The content provider 12 is illustrated as a single box. In an actual implementation, various numbers of content providers may be distributed across a geographic region. Content provider 12 receives information from various sources such as the Internet 14 and a ground- or terrestrial-based network 16. The ground-based network 16 may include optical fibers or a terrestrial-based broadcasting system. Both the Internet 14 and the ground-based network 16 provide content to the content provider 12 and the content provider 12 generates uplink signals 18 through an uplink antenna 20. The uplink signals 18 may be communicated to a satellite system 22 that includes satellites 24, 26, and 28. The satellites 24, 26, and 28 each include an antenna system 30 that is used to generate downlinks to the various vehicles. The content provider 12 may also terrestrially communicate signals 36 to a terrestrial antenna 38. The terrestrial antenna 38, as illustrated, is based on a tower 40. The antenna 38 may also generate signals 42 that are communicated to vehicles 60 within the system. A stratospheric platform 39 may also be used to communicate uplink signals 18 to the vehicles 60.

The content provider 12 may also be coupled to an airport terminal 50 that includes an interface 52 such as a hardwired connector or a wireless interface. The airport terminal 50 through the connector 52 may communicate content to a content distribution system within a vehicle when the vehicle is at a gate or loading terminal.

Various vehicles are collectively and interchangeably referred to as vehicles 60. The various types of vehicles 60 may include an airplane 62, a train 64, a ship 66, and a bus 68. As mentioned, various other types of vehicles such as a recreational vehicle, an SUV, a van, or other multi-seat vehicle may implement such a system. The present disclosure, however, is particularly suited for commercial-type vehicles. Each of the vehicles includes a content distribution system 70. Each content distribution system 70 may be configured slightly differently due to the peculiarities of each individual vehicle. However, each content distribution system 70 may be in communication with an antenna 72 for receiving various content from the various sources including from the satellites 24-28. A terrestrial antenna 74 may be used to receive terrestrial-based signals from the antenna 38. An interface 76 may be used to couple the terrestrial interface 52 to the content distribution system.

The content distribution system 70 provides various types of content including data and television signals to various users within the vehicles 60. The content distribution system 70 may include a wireless distribution system or a wired distribution system. Portions of the system may be wireless while others may be wired. For example, a wired connection may be formed between antenna 70, 72 and the server within the system, while a wireless connection may be used between the terminal and router or switch.

It should be noted that the content distribution system may be loaded with content files while the vehicle is stationary or moving. Also, some content may be loaded while stationary, while other programming is received and stored in real time. That is, live broadcasts may be played in real time and may also be stored.

Figure 2:
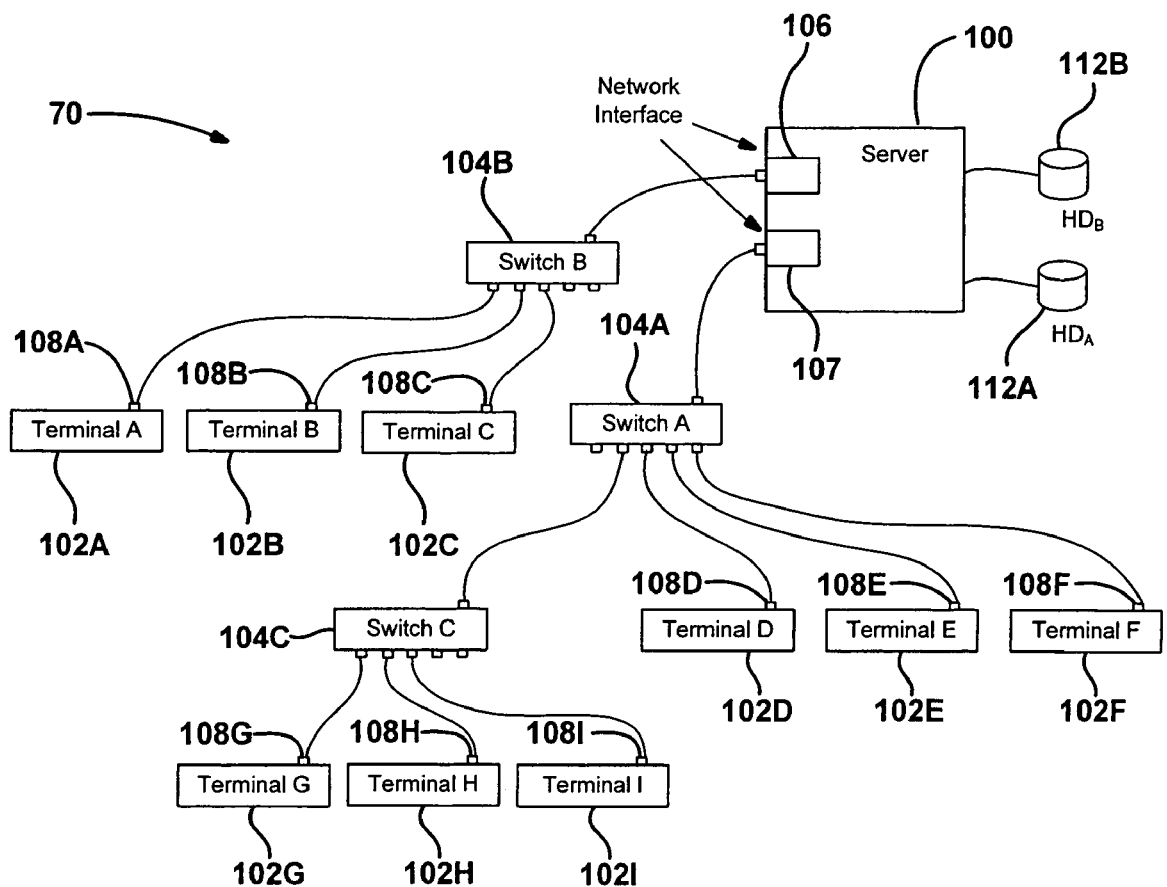
FIG. 2 is a schematic view of the content distribution system within a vehicle.

Referring now to FIG. 2, one embodiment of a content distribution system 70 is illustrated. In this embodiment, a server 100 communicates with terminals 102A-102F through switches 104A and 104B. For the purposes of exemplifying an implementation, the terminology of switches and routers are used interchangeably. A network interface 106 is used to couple the server with switch 104B. Switch 104B is in communication with network interfaces 108A-108C. The network interface 106 may be incorporated within the server or may be a separate component. Likewise, network interfaces 108A-108C may also be separate components or incorporated into the terminals 102A-102C, respectively. Network interface 107 is in communication with switch 104A which, in turn, is in communication with switch 104C. Switch 104C is in communication with terminals 102G-102I. Thus, as can be appreciated, various numbers of switches and various numbers of terminals may be incorporated. As shown by switches 104A and 104C, switches may be cascaded. Although wires are illustrated between the server and the switch and the switch and each individual terminal, some or all of these connections may be wireless. Switches may, thus, be wireless routers rather than a wired router. The terminals may also be the customer's own terminals and may be embodied in a portable user device such as a laptop computer, cellular phone, personal digital assistant, or a portable media player, each having a wireless connection.

The server 100 also includes content storage 112A and 112B. The storage may include hard disk drives or various other types of memory. The content stored on the storage 112A, B may include various programs, shows, movies and the like. The content may be stored as files and may also include a particular encoding or encrypting scheme. The server 100 may include content storage 112A, 112B. The storage 112A, 112B device may communicate with the server using IDE, SATA, USB, or an IEEE 1394 firewire.

It should be noted that the interconnections between the terminals and the server are two-way. That is, the terminal may generate requests for content lists, requests for enhanced play and other control requests, including purchasing requests. The server generates various types of content. It should be noted that each of the types of communication may be performed using Internet protocol (IP). The communication may take the form of content streams of packets using the Internet protocol. The operation of the system will be further described below.

Figure 3A:
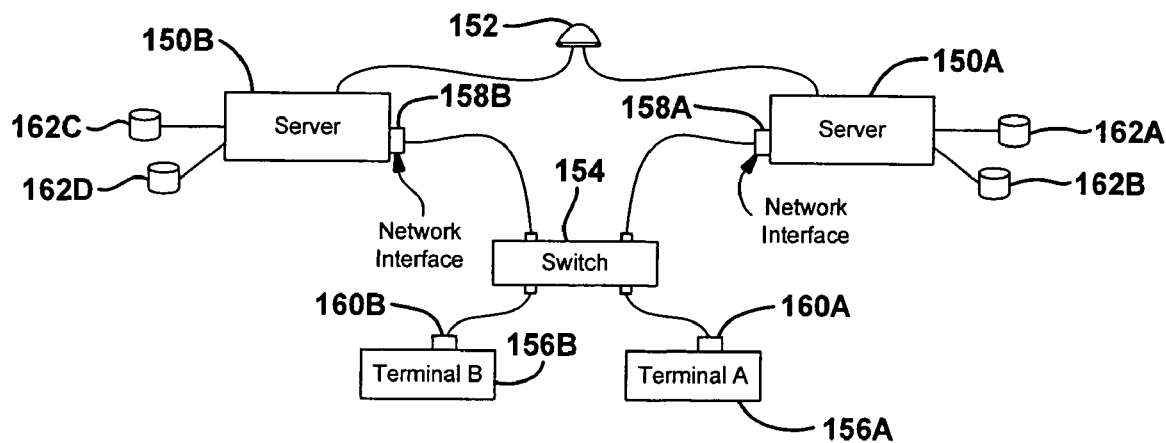
FIG. 3A is an alternative view of a content distribution system according to the present invention.

Referring now to FIG. 3A, another embodiment of the disclosure is illustrated having a first server 150A and a second server 150B coupled to a common antenna 152 and a common switch 154. The switch 154 is coupled to a terminal or plurality of terminals 156A and 156B. Network interfaces 158A and 158B may be provided at the servers 150A and 150B, respectively. Likewise, terminals 156A and 156B may also include network interfaces 160A and 160B.

Each server may also be coupled to a number of storage devices 162A, 162B, 162C, and 162D. As illustrated, server 150A is coupled to storage devices 162A and 162B while server 150B is coupled to storage devices 162C and 162D. Content on the storage devices may be accessible by all terminals of the system.

Although a common antenna 152 is shown, this antenna may also represent a plurality of antennas. Depending on the satellite desired to be tuned to (based on the channel allocation of the satellite), the server may be connected to the proper antenna. That is, a band of antennas, each tuned to a different satellite, may also be represented by antenna 152.

Figure 3B:
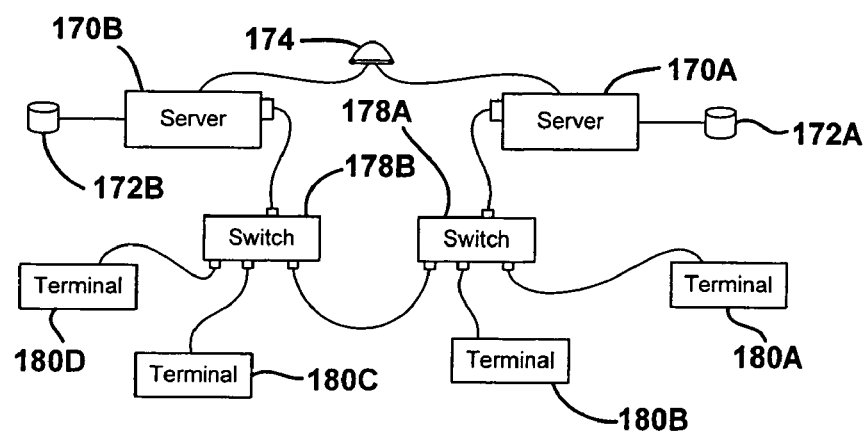
FIG. 3B is an alternative embodiment of a content distribution system according to the present invention.

Referring now to FIG. 3B, servers 170A and 170B have associated storage devices 172A and 172B. Servers 170A and 170B are coupled to a common antenna 174. Each server 170A and 170B is coupled to a switch 178A and 178B. The switches 178A, B are used to route communication signals to and from terminals 180A-180D. In this embodiment, the routers may also be coupled together. By coupling the routers together, some redundancy may be formed.

It should be noted that the switches 154, 178A and 178B in FIGS. 3A and 3B may be implemented as a router and thus the terms are interchangeable.

Figure 4:
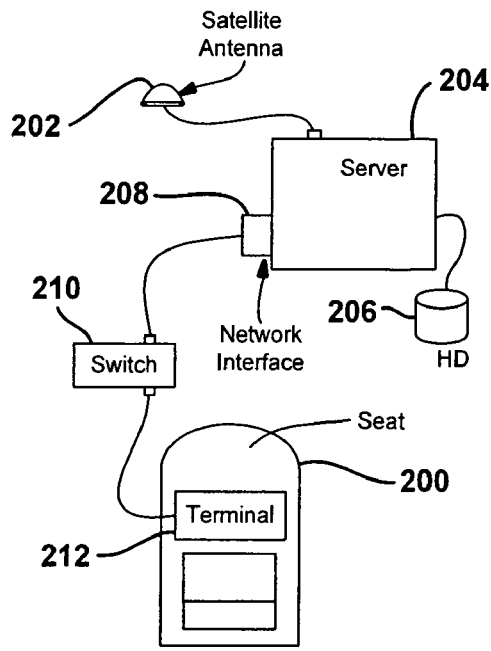
FIG. 4 is a simplified schematic view of a content distribution system for a vehicle for use in a vehicle seat.

Referring now to FIG. 4, a simplified diagrammatic view of a system implemented within a seat 200 is illustrated. In this embodiment, a satellite antenna 202 is in communication with a server 204. Server 204 has an associated hard drive 206. The server 204 is in communication with a network interface 208 that is used to transmit and receive signals to a switch 210 and ultimately to a terminal 212. As mentioned above, terminal 212 is disposed within a seat 200. The seat 200 may be a seat in various types of vehicles including an airplane, a bus, a train, or the like. Details of the seat terminal 212 will be further described below.

Figure 5:
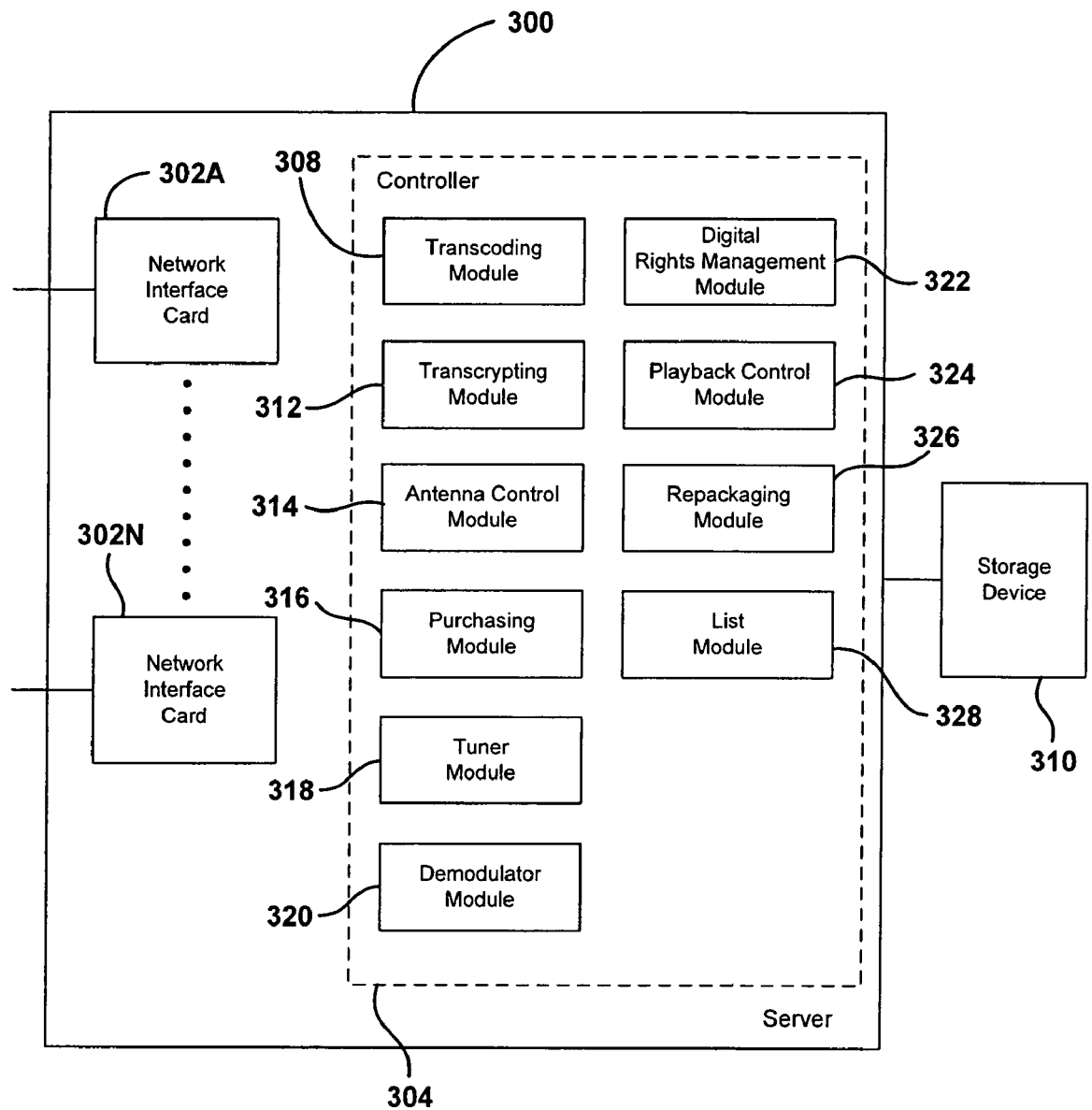
FIG. 5 is a block diagrammatic view of a server according to the present invention.

Referring now to FIG. 5, a server 300 is illustrated in further detail. The servers may be one of the various numbers of servers illustrated in FIGS. 2, 3A, 3B, and 4. The server 300 includes network interface cards 302A-302n. As mentioned above, various numbers of network interface cards 302 may be provided so that the server 300 may be used to communicate with various terminals. The network interface cards 302A-302n may be wired interface cards or wireless interface cards so that wireless connections may be formed. Also, wired connections may be formed between the network interface card and the switches or routers while the connection between the switch and the terminals may be wireless.

Each server 300 includes a controller 304. The controller 304 may have various types of software and hardware therein. The controller may be microprocessor-based. The software and/or hardware may form various modules. Various modules may also be formed by integrated circuits or custom integrated circuits.

The controller 304 includes a transcoding module 308. The transcoding module 308 is used to change the format of the signals within storage device 310. Transcoding may be performed so that content may be distributed in the desired form. A request for a particular coding format or scheme may be requested at the user terminal. The content received from the antenna may have one particular coding scheme such as MPEG2, while it may be desirable to output a different coding scheme such as MPEG4 or a Real Video® stream. As will be described below, transcoding may be performed for all of the signals received or may be performed on an individual basis when a particular piece of content is purchased as will be described below.

Transcrypting module 312 may be used to transcrypt the content before communicating the content to the individual terminals. The transcrypting module 312 may include encrypted packets in a first encryption scheme that are converted to a second encrypted scheme with a different key. This module will be further described below in FIG. 9. The server may keep track of the keys on the system.

The controller 304 may also include an antenna control module 314. The antenna control module 314 may be used to change the position of the antenna based upon the desired tuning of the terminals. For example, the antenna control module 314 may control a single antenna or multiple antennas so that the desired satellites with the desired channels may be received. The antenna control module 314 may simultaneously control the various antennas of the system.

A purchasing module 316 may also be incorporated in the controller 304. The purchasing module 304 may collect and obtain authorizations to charge the users of the various terminals for purchasing content from the system. The purchasing module 316 may communicate credit card numbers or store credit card numbers in a central database until a landline may be used to connect to the system and download the information.

A tuner module 318 is used to select various live TV channels available. The tuner module 318 and the control module 314 may act together to receive various content. The tuner module 318 may also be used to tune to channels for receiving and downloading content.

A demodulator module 320 may be used to demodulate the incoming signal from the various sources.

A digital rights management module 322 may be used to provide digital rights management to the system. The digital rights management module 322 may be used to limit the rights of content purchase by the various users of the terminals within the vehicle. For example, digital rights may only include a certain number of times that a particular piece of content may be played back. Further, digital rights may also include other variations including the expiration after a predetermined period of time, or the like.

The controller 304 may also include a playback control module 324. The playback control module 324 is used to control the various playbacks for the various terminals of the various content from the storage device 310. As will be described below, the playback at each of the terminals may be independently controlled. That is, the same content may be distributed to various users at different times.

A repackaging module 326 may also be included within controller 304. The repackaging module 326 may remove or change a packet type from a first packet type to a second packet type. That is, the data is removed from the data packet and re-packetized into a second type of packet.

A list module 328 may be included within the controller 304. The list module 328 obtains a list of the content currently available in the storage device 310 when queried by a terminal. The list module 328 may continually update the list based on content received while the vehicle is in motion through another content signal. That is, various material may be stored within the storage device 310 as the vehicle is in motion. Thus, the list module continually updates the list of available material for providing to a terminal upon a query. A first list may be generated at the request of a first terminal and a second list may be generated at the request of a second terminal. When the second list is generated it may be at a later time and, therefore, contain different selections within the list.

Figure 6:
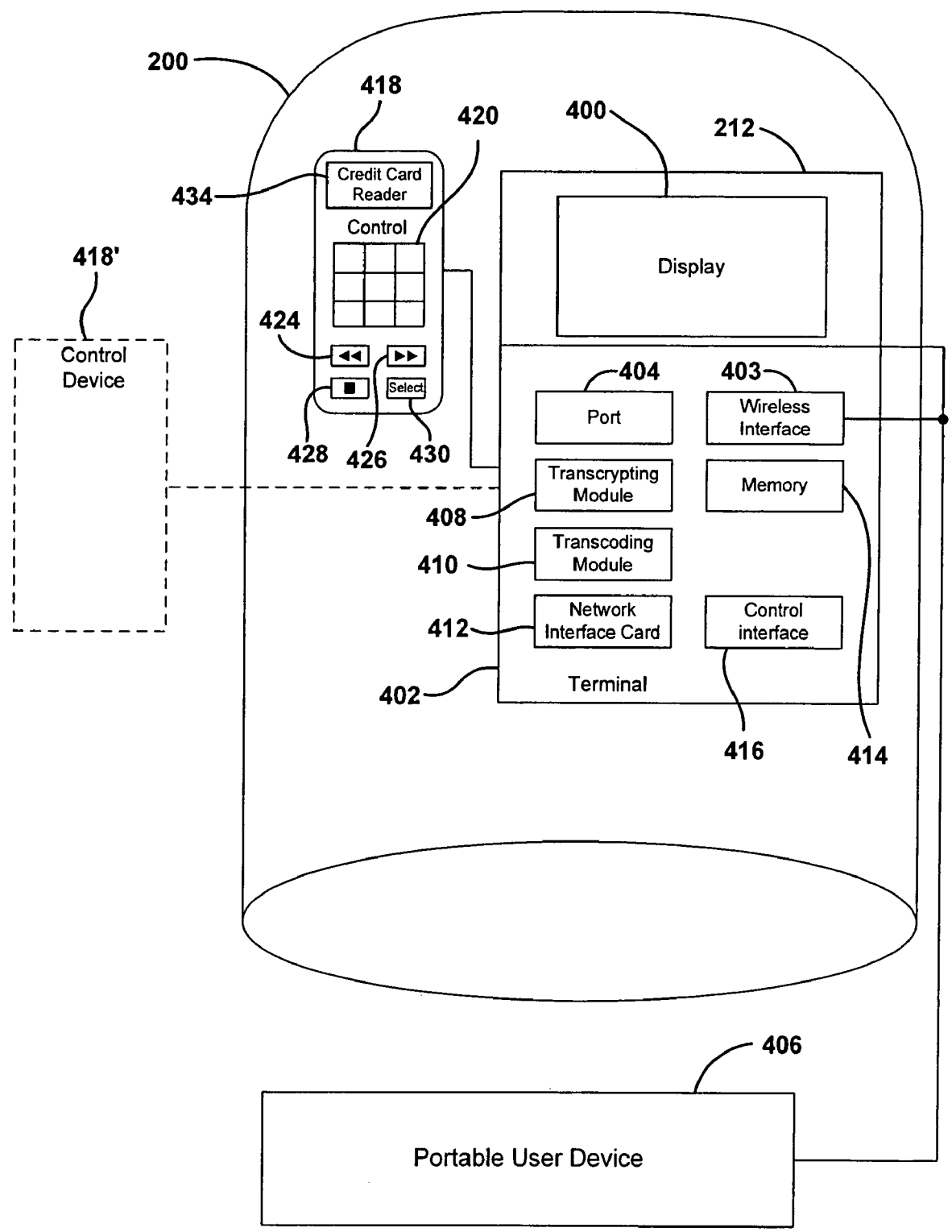
FIG. 6 is a block schematic view of a terminal system according to the present invention.

Referring now to FIG. 6, a seat 200 and terminal 212 of FIG. 4 are illustrated in further detail. The terminal 212 may include a display 400 therein. The display 400 may also be a separate device while the terminal only contains control electronics. As illustrated, the terminal 400 is integral with the controller 402 of the terminal. The terminal 212 may include a wireless interface 403 or a port 404 for communicating with an external portable device. As will be further described below, the terminal 212 may be used to download or store various content on a portable user electronic device 406 such as a laptop computer, cellular phone, a personal digital assistant, or a portable media player. The interface 403 may also be used to transmit content to the portable device for playback. That is, the portable device screen display may be used instead of, or in addition to, display 400. The interface may be a wired interface or wireless interface. For a wired interface, the port 404 may be a USB interface. Wireless interface 403 may, for example, be a Bluetooth interface or various other types of wireless interfaces, including an RF interface or an IEEE 802.11a/b/g/n connection. The portable user device 406 may communicate various information to the server. This may be performed directly or through the terminal. For example, playback resolution, playback bit rate, aspect ratio and digital rights management (DRM) type. If connected to the terminal, the terminal 212 may only serve as a proxy server.

The controller 402 of terminal 212 may include a transcrypting module 408 that is used to transcrypt the data in a similar manner to that described above in FIG. 5. The controller 402 may also include a transcoding module 410 that also acts in a similar manner to the transcoding module 308 described above. The controller 402 may also include a network interface card 412, a memory 414, and a control interface 416 for coupling to a control device 418. The control device 418 may be integral with the terminal 212 or may be a separate component such as a remote control. The control device 418 may include buttons 420 for entering various numerical or alphanumerical characters. The control device 418 may also include playback or modified playback buttons including a rewind button 424, a forwarding button 426, a play button 428, and a select button 430. The control device 418 may also include a credit card reader 434. The credit card reader 434 may be used in purchasing content from the server. In purchasing, the credit card reader 434 or buttons 420 may be used to enter a credit card number or other identifier so that the proper user may be billed for the content.

As illustrated, the control device 418 is illustrated in the seat 200. The control device 418 may be wired to the controller 420. The control device 418 may also be a wireless device and act as a remote control that may be removed from the seatback. The control device 418 may also be permanently mounted within the seatback or permanently coupled to the terminal 212. The control device 418 may also be a touch-screen panel combined with the display device 400. As is illustrated, a second control device 418' is illustrated to highlight the fact that the control device 418' may be a remote control device wirelessly coupled to the terminal 212.

Figure 7:
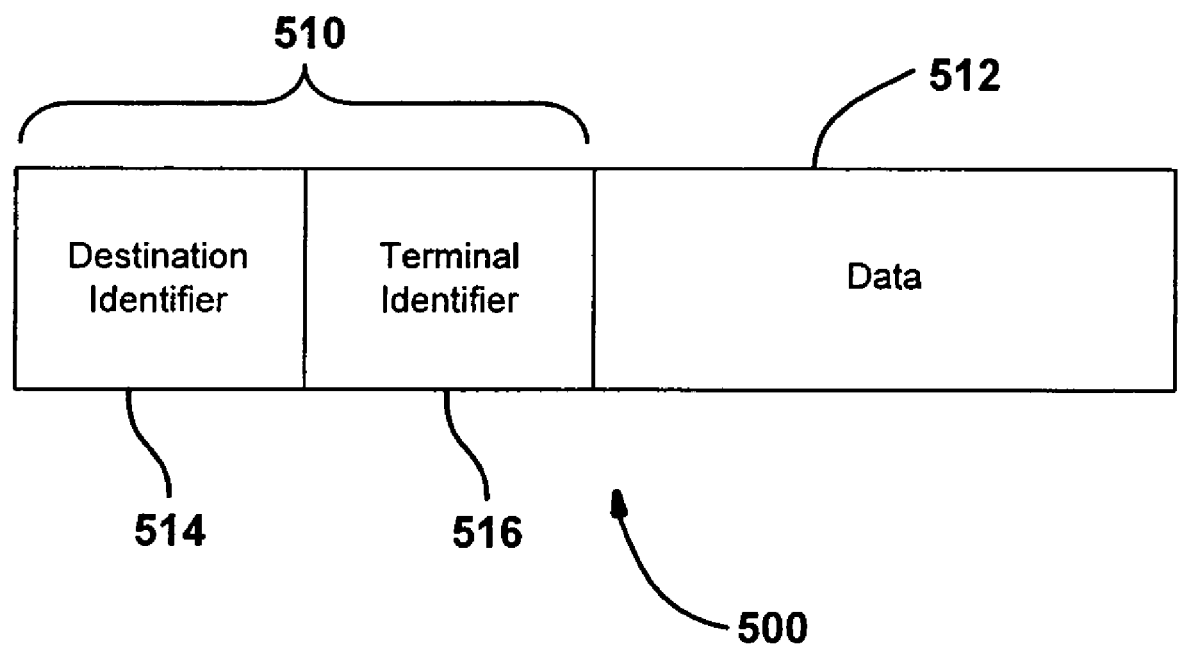
FIG. 7 is a layout representation of a data packet according to the present invention.

Referring now to FIG. 7, as mentioned above, the communications preferably take place using a packetized transport protocol such as the Internet protocol. In Internet protocol a packet 500 includes a header portion 510 and a data portion 512. The header portion 510 may include a destination identifier 514 and a source identifier 516. In a communication from a terminal, the source identifier 516 may identify the terminal from which the request for information was transmitted and the destination identifier 514 may identify the particular server that the terminal requires to obtain the particular information. In a communication from a server, the destination identifier 516 may identify the terminal to which the information is destined. The destination identifier may also be a group identifier such that any terminal that joins a particular group can identify data packets addressed to that specific group.

The data portion 512 may be various types of data portions including a list or portions of content. The list or content may be segmented into various segments for delivery to the various terminals. When using a modified playback mode, the data portions may change so that the modified playback mode may be achieved.

Figure 8:
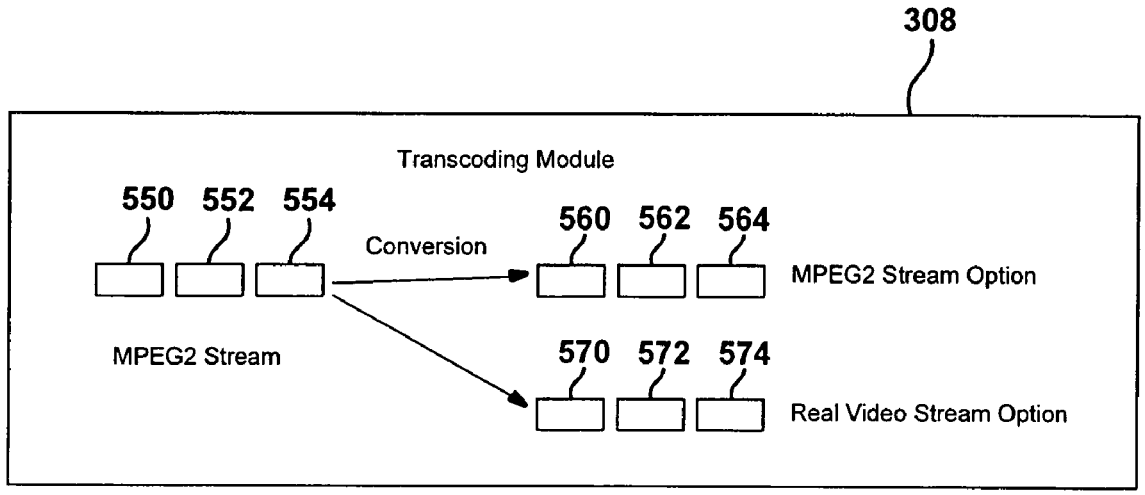
FIG. 8 is a schematic representation of a transcoding module.

Referring now to FIG. 8, a transcoding module 308 is illustrated in further detail. A transcoding module 308 may be used to transcode packets 550, 552, and 554 into different coding schemes. As illustrated, the packets 550-554 are in an MPEG2 format. The transcoding module 308 may, for example, convert packets 550-554 into packets 560, 562, and 564 that are in an MPEG4 format. The packets 550-554 may also be converted into packets 570, 572, and 574. Packets 570-574 may be in a Real Video® stream. Of course, various types of conversions into various types of formats may also be performed.

Figure 9:
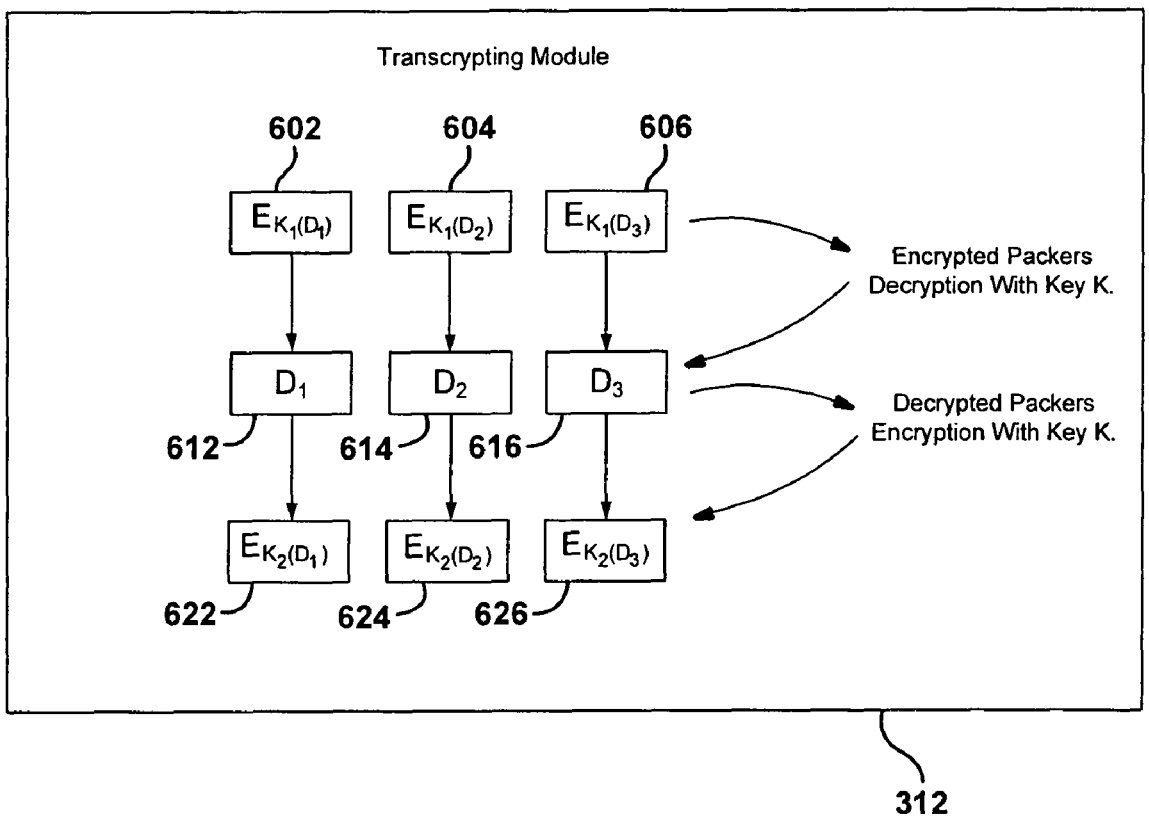
FIG. 9 is a representation of a re-encryption module from the controller.

Referring now to FIG. 9, transcrypting module 312 is illustrated in further detail. In this embodiment, a plurality of packets 602, 604, and 606 are encrypted using algorithm E1 with a first content key $K_1$. The transcrypting module 312 decrypts the encrypted packets 602, 604, and 606 to form decrypted data packets 612, 614, and 616, respectively. A second algorithm E2 and key $K_2$ is used to encrypt the packets 612-616 into packets 622, 624, and 626. Transcrypting may be performed before streaming the content from the server. Symmetric, asymmetric and combinations of these algorithms can be used.

Figure 10:
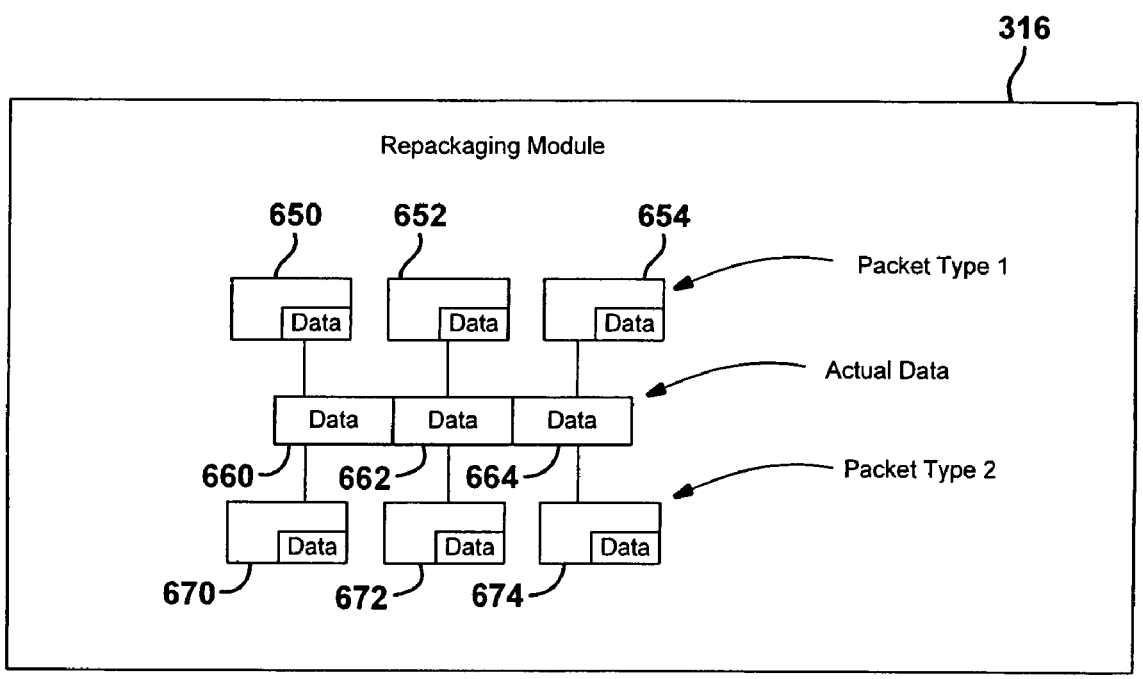
FIG. 10 is a representation of a repackaging module of the controller.

Referring now to FIG. 10, repackaging module 316 of FIG. 5 is illustrated in further detail. In this embodiment, packets 650, 652, and 654 are configured under a first packet type. The repackaging module 316 removed the packaging from the packets and provides data portions 660, 662, and 664. The repackaging module 316 then reformats the data 660-664 into a second packet type 670, 672, and 674.

The present disclosure may be used to more conveniently connect and allow use of various content from a server to various user terminals.

Figure 11:
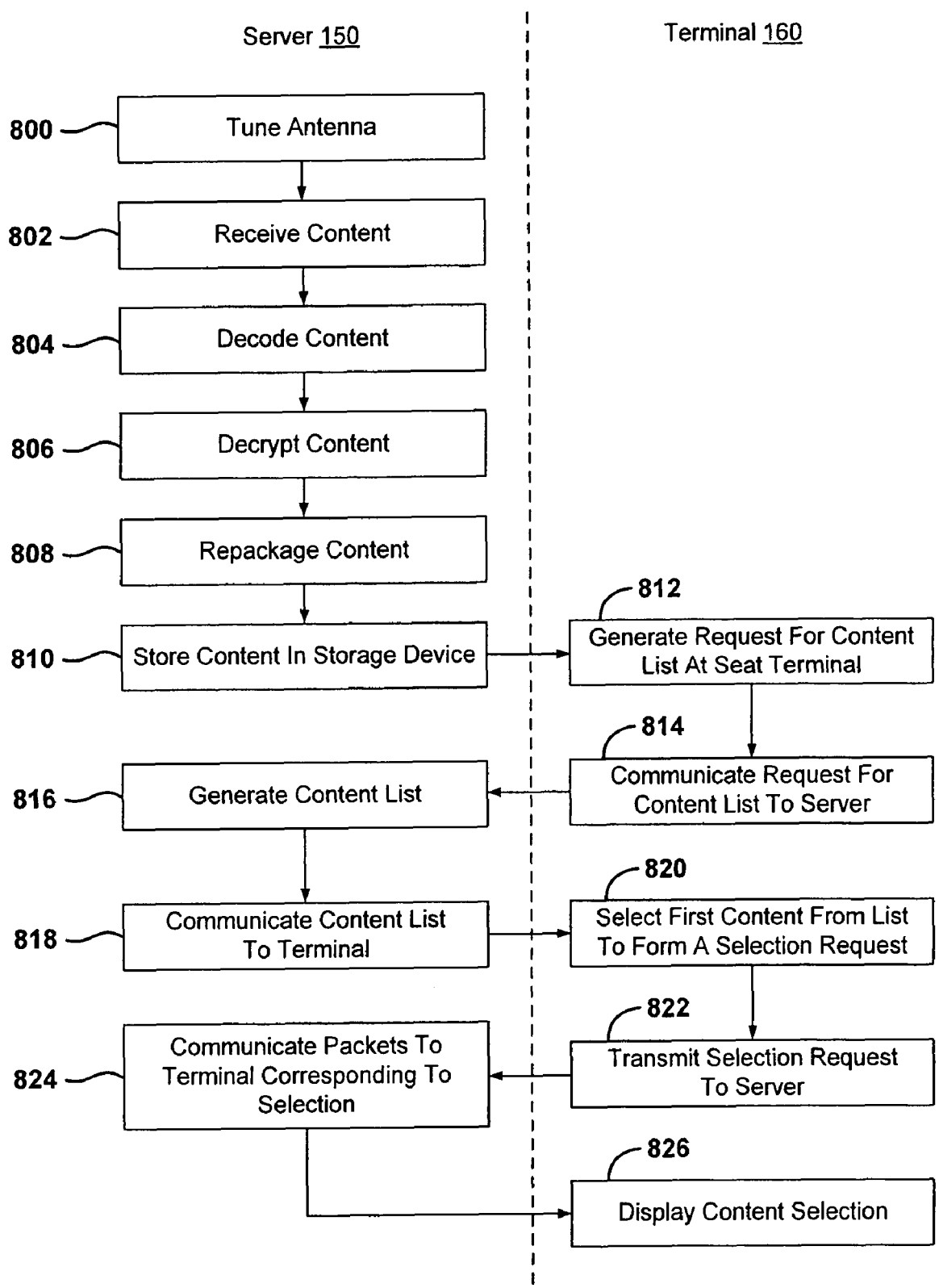
FIG. 11 is a flowchart of a method of distributing content to users within a vehicle.

Referring now to FIG. 11, a first method in the operation of the system is illustrated. In step 800, the antenna or antennas associated with the system is tuned to the content. This may entail tuning one antenna to one satellite, while another antenna is tuned to another satellite. The tuning may also be performed by tuning to a terrestrial-based antenna such as the antenna 38 illustrated in FIG. 1. In step 802, content is received. The content may be received and decoded in step 804. In step 806, the content may be decrypted. In step 808, the content may be repackaged as described above. In step 810, the content may be stored on the storage devices associated with the server. The content may also be streamed live to the various terminals. The content may also be streamed on a delayed basis from the server.

In step 812, a request for content list is generated at the seat terminal. In step 814, the request for the content list is communicated to the server. This may be routed through various switches and routers as mentioned above. The communication may also be formed using Internet protocol. In step 816, a content list is generated. The content list may be generated using the content list module 318 illustrated in FIG. 5. In step 318, the content list is communicated to the terminal. Again, the content list itself may also be distributed using Internet protocol. The list may be communicated through the various routers and switches described above.

In step 820, the terminal receives the content list and selects content from the list to form a content selection request. The content may be selected in various manners, including using the control device 418. The control device 418 may move an on-screen selector device and a selection may be provided through the use of the select button or switch 430 illustrated in FIG. 6. A numerical selection may also be provided by using the number pad 420. It should be noted that the list may be different for later received list requests depending on newly received content.

The selection request is communicated to the server in step 822. The selection request may also use Internet protocol. In step 824, packets or content stream including the content are generated at the server and routed through routers or switches to the terminal. The content packets correspond to the selection from steps 820 and 822. In step 826, the content selection is displayed on the display 400. A content stream for a second terminal using the same content may be generated in a similar manner. The streams may be started at different times. The different streams may be completely independent.

Figure 12:
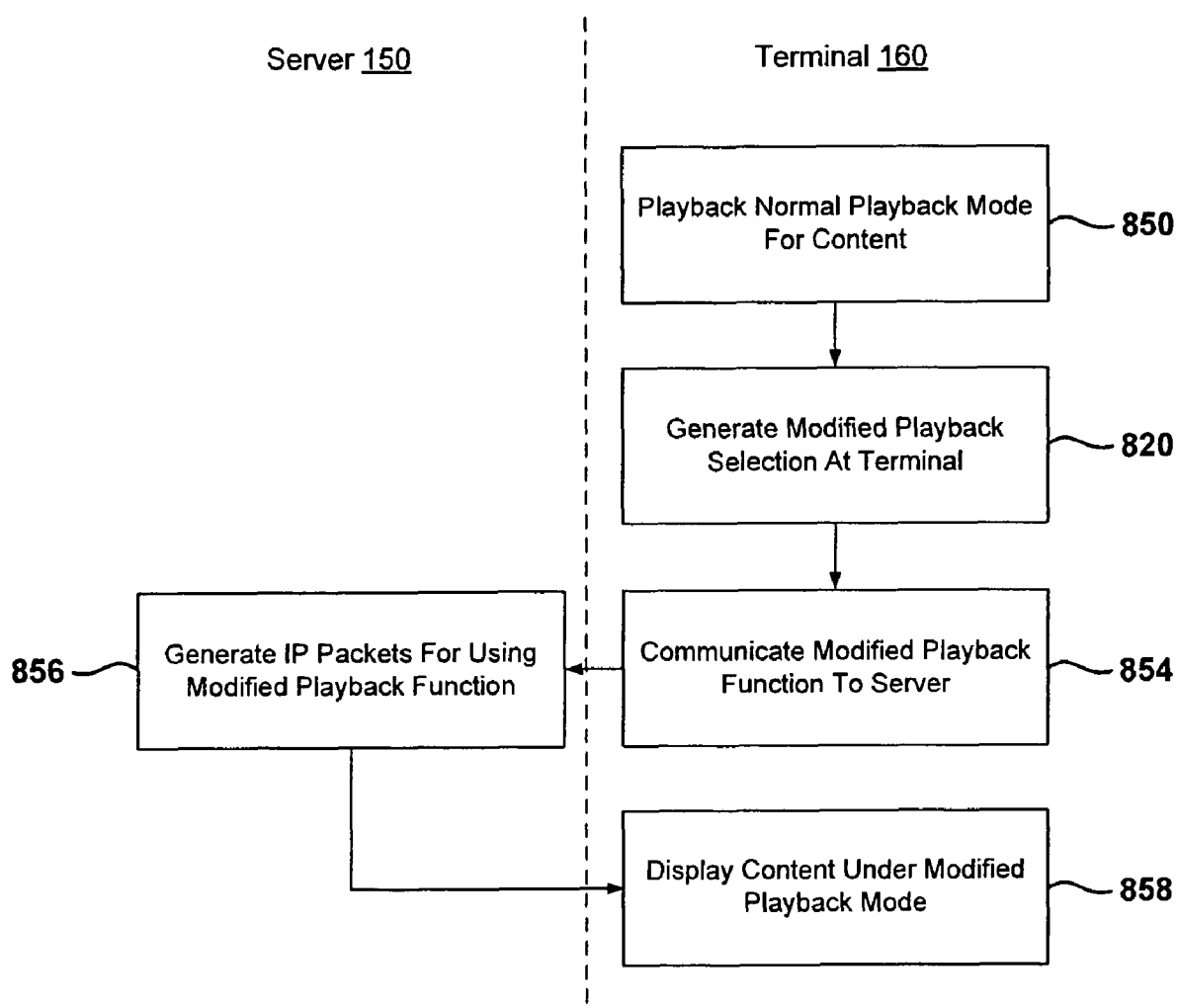
FIG. 12 is a flowchart illustrating a method for providing independent playback functions to various terminals within a vehicle.

Referring now to FIG. 12, the content distribution system 70 may also be used to play back information in a modified mode or using a modified playback function. In step 850, the normal playback mode for the content is selected. Continuing with the description described above, the playback mode may be a normal playback mode in a single or regular playback speed. Content for the playback are provided using Internet protocol from the server and assembled for playback in the terminal. In step 852, the control device associated with the terminal may be used to generate a modified playback request. In step 854, the modified playback request is communicated to the server. The modified playback function request may take the form of an Internet protocol packet. In step 856, an IP packet for use modified playback function is generated. That is, the data in the packet is changed according to the function. Various functions include a fast-forward function or a rewind function. Also, fast-forwarding in multiples or rewinding in multiples may also be used.

In step 858, the content under modified playback mode is displayed on the display of the terminal. It should be noted that the display of the content in the modified mode does not affect any other terminal or any other stream. Thus, each of the playback modes of the various terminals and the content of the playback modes is independent. Therefore, each user associated with the terminal may have a different experience even if using the same content file stored on the server. That is, various portions of the content may be accessed by various terminals at different times within the content file. Thus, a unique viewing experience may be achieved by each of the terminals. The position within the content may thus be changed at will without regard to other content streams for other terminals.

Figure 13:
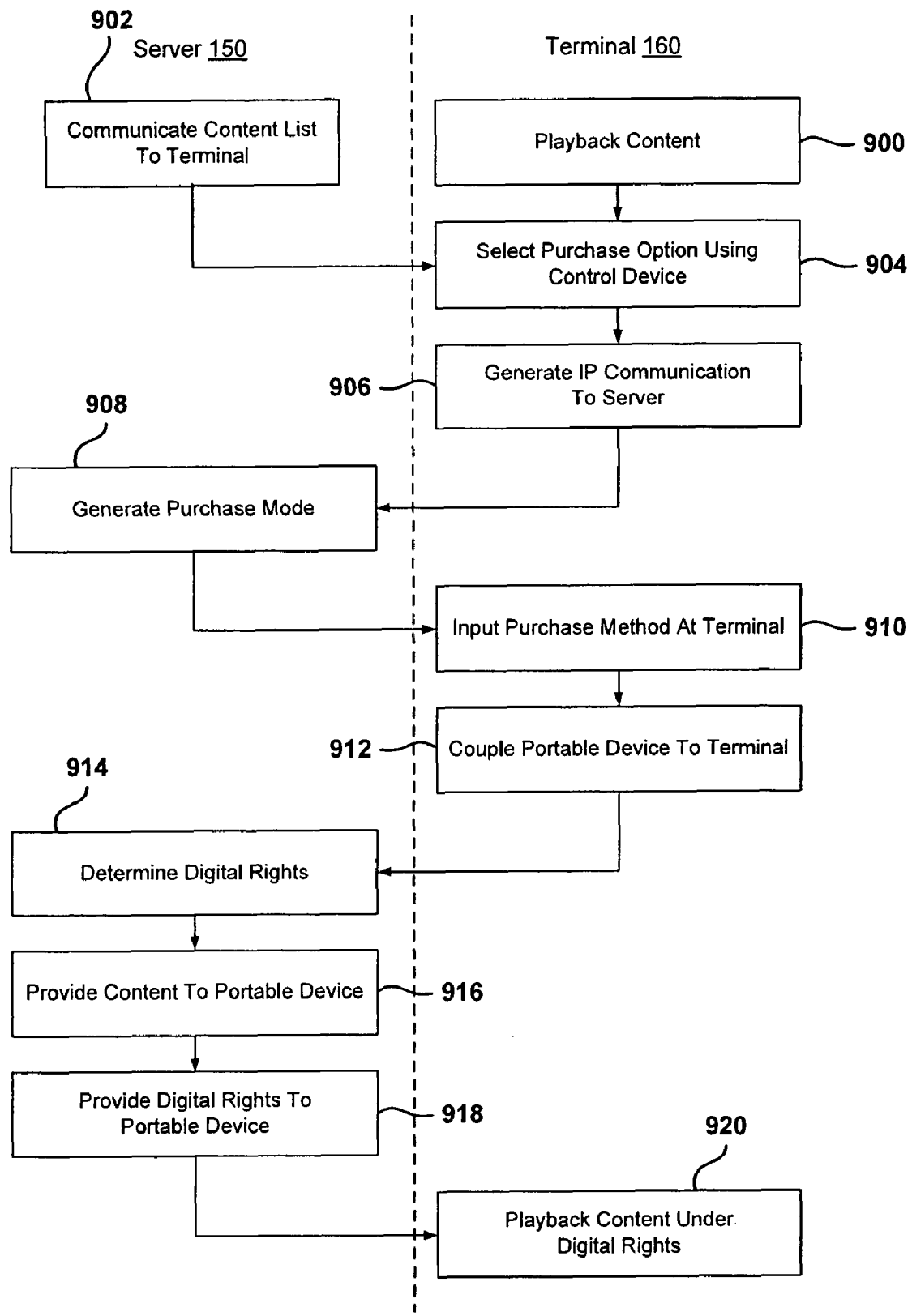
FIG. 13 is a flowchart illustrating a method for purchasing content according to the present disclosure.

Referring now to FIG. 13, when using or viewing the content, the content may not be fully viewed in its entirety. That is, a movie or the like may not be fully completed before reaching a destination. Therefore, the present system may also allow purchasing to take place. Thus, the content may be removed from the vehicle on a portable device. In step 900, the purchasing event may take place during playback of content. Also, the purchasing event may also take place when a content list is communicated to a terminal in step 902. A "purchase" button on the control device may also be used to purchase a selection. In step 904, a purchasing option may be communicated using the control device. This may be done using the Internet protocol. The playback content may be performed by selecting a particular screen option or entering a particular code. In step 906, an Internet protocol communication is communicated to the server that the particular content is desired to be purchased. In step 908, a purchasing mode is entered at the server. In step 910, the purchase method is input at the terminal. The purchase method may include entering a seat number so the credit card used in the purchasing of the seat may be billed. Further, a credit card number may be billed by entering the number on the key pad of the control device or using the credit card reader associated therewith. In step 912, once the purchasing has been authorized, the portable device may be coupled to the terminal. The portable device that is desired to receive the content may be coupled wirelessly or by a wired connection. For example, a USB connection or the like may be used to communicate the content.

Digital rights may also be associated with the content. The digital rights may be determined at the server in step 914. The digital rights associated with a file may be determined based upon the content type. For example, movies may include more limited rights whereas live television programming may have unlimited rights. In step 916, content is provided to the portable device. In step 918, the digital rights associated with the portable device are also provided. As mentioned above, the digital rights may limit the amount of copies, the numbers of playbacks associated with the particular content, or the time limit for the content. In step 920, the content is played back under the digital rights scheme set forth for the file. If the rights are expired, the playback of the content may be disabled.

Figure 14:
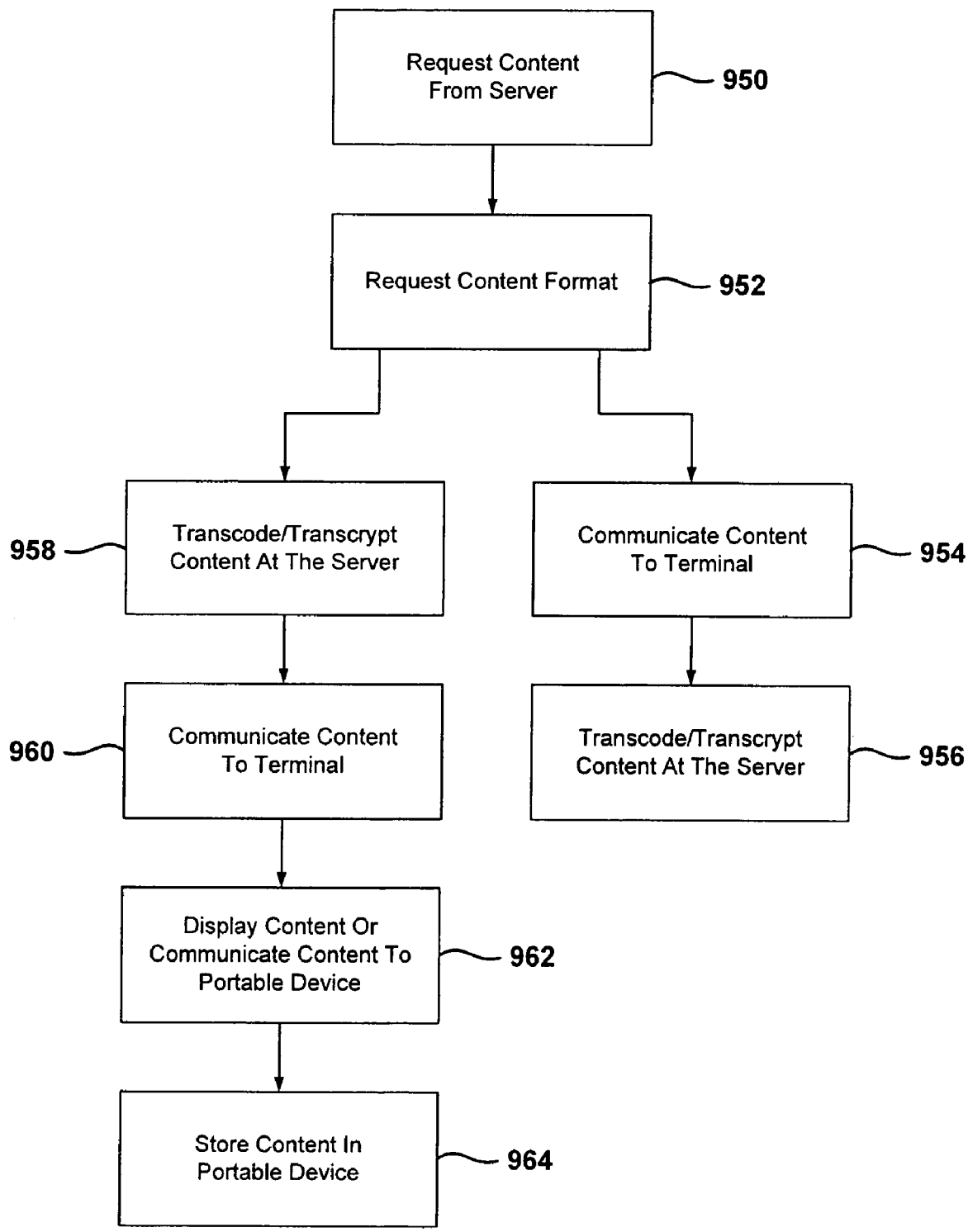
FIG. 14 is a flowchart illustrating a transcoding and transcrypting method according to the present disclosure.

Referring now to FIG. 14, the system may also be used to transcode or transcrypt content. The transcryption may occur either at the terminal or at the server. In step 950, content is requested from the server. In step 952, a particular format for the content may also be requested. The particular format for the content may also be automatically determined through some query or negotiation process when connecting the portable device with the terminal. This content may be a selection box during the purchase of content. In step 954, the content may be communicated to the terminal. In step 956, the content may be transcoded or transcrypted (or both) as described above. Referring back to step 952, if the content is to be transcrypted or transcoded at the server, step 958 is performed. In step 960, content is communicated to the terminal once it is transcoded or transcrypted at the server. It should be noted that in steps 958 and 956, both transcryption and transcoding may take place. Also, either transcoding or transcrypting may take place. In a commercial embodiment, it may be more desirable to transcrypt at the server so the keys may be more easily tracked.

Step 962 is performed after steps 960 and 956. In step 962, the content is displayed on the terminal or it is communicated to the portable device. Both the displaying of the content and communicating to the portable device may also take place. The downloading of the content may also take place in a rapid mode so the rapid storing of the content may take place. In step 964, the content is stored in the portable device for later playback.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A method of operating a system comprising:
   generating a request for a list of content at a terminal;
   communicating the request to a server;
   providing the list of content to the terminal from the server;
   selecting a selection and a selection format from the list of content;
   transcrypting or transcoding content corresponding to the selection to form modified content in the selection format;
   streaming the modified content corresponding to the selection to the terminal in the selection format from the server; and
   displaying the modified content on the terminal.

2. A method as recited in claim 1 wherein generating a request is performed using a packetized transport protocol.

3. A method as recited in claim 1 wherein generating a request is performed using an Internet protocol.

4. A method as recited in claim 1 wherein providing a content list is performed using a packetized transport protocol.

5. A method as recited in claim 1 wherein providing a content list is performed using an Internet protocol.

6. A method as recited in claim 1 wherein streaming the content comprises packetizing the content.

7. A method as recited in claim 1 wherein streaming the modified content comprises communicating the modified content using a packetized transport protocol.

8. A method as recited in claim 1 wherein streaming the modified content comprises communicating the modified content using an Internet protocol.

9. A method as recited in claim 1 further comprising:
   selecting a purchase request from the terminal;
   communicating content to a portable device through the terminal after selecting a purchase request;
   storing the content within the portable device.

10. A method as recited in claim 9 wherein transcrypting or transcoding is performed prior to storing.

11. A method as recited in claim 1 wherein transcrypting or transcoding is performed prior to streaming.

12. A method as recited in claim 1 wherein transcrypting or transcoding is performed in the terminal.

13. A method as recited in claim 1 wherein the terminal is disposed within a vehicle.

14. A method as recited in claim 13 wherein the vehicle comprises an airplane.

15. A method as recited in claim 13 wherein the vehicle comprises a train.

16. A method as recited in claim 13 wherein the vehicle comprises a bus.

17. A method as recited in claim 13 wherein the vehicle comprises a ship.

18. A method as recited in claim 1 wherein the terminal is disposed within a seat back of a vehicle.

19. A method as recited in claim 1 wherein streaming the content is performed through an interface port.

20. A method as recited in claim 19 wherein the interface port comprises a USB port.

21. A method as recited in claim 19 wherein the interface port comprises a wireless connection.

22. A method as recited in claim 21 wherein the wireless connection comprises a Bluetooth connection.

23. A content distribution system for storing content comprising:
   a storage device;
   a server in communication with the storage device communicating content using a packetized transport protocol; and
   a first terminal communicating with the server, said terminal generating a request for a list of content, receiving the list of content from the server and selecting a selection and selection format from the list of content,
   said server streaming the content corresponding to the selection to the terminal, said terminal displaying the content;
   the server or the terminal transcrypting or transcoding the content corresponding to the selection into the selection format.

24. A content distribution system for storing content comprising:
   a storage device;
   a server in communication with the storage device communicating content using an Internet protocol; and
   a first terminal communicating with the server, said terminal generating a request for a list of content, receiving the list of content from the server and selecting a selection from the list of content,
   said server streaming the content corresponding to the selection to the terminal, said terminal displaying the content;
   the server or the terminal transcrypting or transcoding the content.

25. A system as recited in claim 24 wherein the request is performed using a packetized transport protocol.

26. A system as recited in claim 24 wherein the request is performed using an Internet protocol.

27. A system as recited in claim 24 wherein the content list is provided using a packetized transport protocol.

28. A system as recited in claim 24 wherein the content list is provided using an Internet protocol.

29. A system as recited in claim 24 wherein the content is packetized.

30. A system as recited in claim 24 wherein the content is provided using Internet protocol.

31. A system as recited in claim 24 further comprising a portable user device, said terminal selecting a purchase request, said server communicating content to the portable device through the terminal.

32. A system as recited in claim 24 wherein the server or terminal transcrypts or transcodes the content prior to storing.

33. A system as recited in claim 24 wherein the server or terminal transcrypts or transcodes the content prior to streaming.

34. A system as recited in claim 24 wherein the terminal transcrypts or transcodes the content.

35. A system as recited in claim 24 wherein the server transcrypts or transcodes the content.

36. A system as recited in claim 24 wherein the terminal is disposed within a vehicle.

37. A system as recited in claim 36 wherein the vehicle comprises an airplane.

38. A system as recited in claim 36 wherein the vehicle comprises a train.

39. A system as recited in claim 36 wherein the vehicle comprises a bus.

40. A system as recited in claim 36 wherein the vehicle comprises a ship.

41. A system as recited in claim 24 wherein the terminal is disposed within a seat back of a vehicle.

42. A system as recited in claim 24 wherein the terminal comprises an interface port for communicating the transcoded or transcrypted content to a portable device.

43. A system as recited in claim 42 wherein the interface port comprises a USB port.

44. A system as recited in claim 42 wherein the interface port comprises a wireless connection.

45. A system as recited in claim 44 wherein the wireless connection comprises a Bluetooth connection.

46. A system as recited in claim 31 wherein the portable user device automatically communicates with the terminal to specify a communication format or encryption format and the terminal transcoding and transcrypting the content into the communication format or encryption format.

47. A system as recited in claim 31 wherein the portable user device automatically communicates with the server to specify a communication format or encryption format and the server transcoding and transcrypting the content into the communication format or encryption format.

* * * * *